United States Patent [19]

Hopper

[11] 4,017,468
[45] Apr. 12, 1977

[54] N-CHLOROTHIOCARBOXYLIC ACID AMIDE/IMIDE-MODIFIED TERPOLYMERS

[75] Inventor: Roger J. Hopper, Akron, Ohio

[73] Assignee: The Goodyear Tire & Rubber Company, Akron, Ohio

[22] Filed: June 30, 1975

[21] Appl. No.: 591,372

[52] U.S. Cl. .................. 260/79.5 B; 260/45.8 NE; 260/784; 526/20; 526/50

[51] Int. Cl.$^2$ .......................................... C08K 5/44

[58] Field of Search ...... 260/784, 79.5 B, 45.8 NB, 260/326 S

[56] References Cited

UNITED STATES PATENTS

| 3,544,531 | 12/1970 | Morita | 260/79.5 B |
|---|---|---|---|
| 3,586,696 | 6/1971 | Kerwood et al. | 260/326 S |
| 3,644,304 | 2/1972 | Adolf | 260/79.5 B |
| 3,709,907 | 1/1973 | Behforouz | 260/326 S |
| 3,838,114 | 9/1974 | Lawrence | 260/79.5 B |

FOREIGN PATENTS OR APPLICATIONS

| 816,266 | 6/1974 | Belgium |
|---|---|---|
| 1,355,801 | 6/1974 | United Kingdom |
| 1,355,802 | 6/1974 | United Kingdom |

OTHER PUBLICATIONS

I & EC Product Research and Development – vol. 1, No. 2, June 1962, pp. 70 to 78.
Germany Offenlegungsschrift 2005692 published Feb. 7, 1970.

*Primary Examiner*—V. P. Hoke
*Attorney, Agent, or Firm*—F. W. Brunner; H. C. Young, Jr.

[57] ABSTRACT

A modified rubbery terpolymer, and blends thereof, which comprises the admixture product of a rubbery terpolymer of ethylene, α-olefin and non-conjugated diene with at least one compound selected from specific types of N-chlorothiocarboxylic acid amides and imides. The sulfur-cured composites are particularly useful in the sidewall portions of pneumatic tires.

12 Claims, No Drawings

N-CHLOROTHIOCARBOXYLIC ACID AMIDE/IMIDE-MODIFIED TERPOLYMERS

This invention relates to modified rubbery polymers having a low degree of unsaturation, a process for preparing such modified polymers, mixtures of such modified polymers with highly unsaturated rubbery polymers, and to the vulcanizates of such mixtures.

Mixtures or blends of low-unsaturation rubbery polymers with highly unsaturated rubbery polymers are of practical importance because of the superior ozone resistance imparted to the blend by the low-unsaturation rubber. Unfortunately, the presence of the low-unsaturation rubber also affects the mechanical and hysteresis characteristics of the vulcanizates in an adverse manner, as manifested by lower tensile strength and modulus values, and by higher dynamic heat build-up and permanent set. These undesirable phenomena are generally the result of the mutual insolubilities of the two types of rubber, the substantially slower cure rate of the low-unsaturation rubber, and the greater affinity of the typically polar curatives for the high-unsaturation rubber. As a net result, the vulcanized blend is a heterogeneous dispersion of largely uncured low-unsaturation rubber in well cured high-unsaturation rubber. The degraded mechanical and hysteresis properties caused by this unbalance cure severely limit, or preclude, the use of such blends in articles subjected to severe service requirements such as tires. A process for improving the physical and dynamic properties of such rubbery polymer vulcanized blends is of considerable commercial practical importance.

It is, therefore, an object of this invention to provide a modified rubbery polymer having a low degree of unsaturation, a process for its preparation and composites thereof with high-unsaturation rubbery polymers.

In accordance with this invention, a modified rubbery terpolymer is provided which comprises an admixture of a rubbery terpolymer of ethylene, an α-olefin containing 3 to 6 carbon atoms and a non-conjugated diene containing 6 to 12 carbon atoms with at least one compound selected from N-chlorothio-carboxylic acid amides and imides of the formulae:

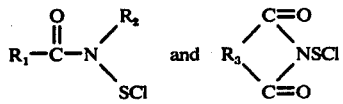

where $R_1$ and $R_2$ are radicals which can be individually selected from alkyl, cycloalkyl, benzyl, and phenyl radicals, where $R_1$ can additionally be selected from hydrogen, where the aromatic rings of said phenyl and benzyl radicals may be substituted with one or two radicals selected from alkyl an chloro radicals, where $R_1$ and $R_2$ may be taken together to represent an alkylene radical of 3 to 5 carbon atoms and where $R_3$ may be an alkylene radical of 2–4 carbon atoms, a 1,2-cycloalkylene radical of 6–8 carbon atoms, or an orthophenylene radical of 6 to 8 carbon atoms.

Representative of such alkyl radicals are methyl, ethyl, n-propyl, isopropyl, n-butyl and isobutyl radicals; representative of cycloalkyl radicals are those containing 6 to 8 carbon atoms such as cyclohexyl and cyclooctyl radicals; representative of such phenyl radicals are p-xylyl and 2,4-dichlorophenyl radicals and representative of such benzyl radicals are p-methylbenzyl and p-chlorobenzyl radicals. Representative of various alkylene radicals formed by the joining of $R_1$ and $R_2$ is the pentamethylene radical. Representative of the alkylene or arylene radicals denoted by $R_3$ are ethylene, 1,2-cyclohexylene, or orthophenylene radicals.

Representative of various N-chlorothio-carboxylic acid amides are N-chlorothio-N-cyclohexyl formamide, N-chlorothio-N-phenyl formamide and N-chlorothio-N-(p-chlorophenyl)formamide. Representative of various N-chlorothio-carboxylic acid imides is N-chlorothiophthalimide. Generally, N-chlorothio-N-cyclohexyl formamide is preferred in the practice of this invention.

In further accordance with this invention, it has been discovered that a new and useful composite comprises 100 parts by weight of the modified rubbery terpolymer of this invention in admixture with about 18 to about 670 parts by weight of a rubber polymer selected from at least one of cis-1,4-polyisoprene natural rubber, synthetic cis-1,4-polyisoprene, polybutadiene, butadiene-styrene copolymer with a butadiene/styrene mole ratio in the range of about 60/40 to about 95/5, butadiene-acrylonitrile copolymer, polypentenamer of the type derived from ring opening polymerization of cyclopentene, bromobutyl, chlorobutyl and polychloroprene.

For this purpose, it is preferred that said rubbery terpolymer is of ethylene, propylene and a minor amount of a non-conjugated diene. Improved blends include those wherein the low unsaturation rubber/chlorothio-acid amide/imide comprises about 15 to about 80 weight percent of the rubber blend, the remainder being high-unsaturation rubber.

Furthermore, it has been discovered that an improved rubber comprises the accelerated sulfur cured mixture of the said composite. The invention can therefore particularly relate to a pneumatic tire casing of toroidal shape, outer tread portion and spaced beads having a sidewall connecting said tread portion and bead comprised of said sulfur-cured composite. Such sidewall can demonstrate an improved adhesion to the tire carcass or casing.

It is to be understood that an accelerated sulfur cure can be achieved with elemental sulfur or an organic sulfur donor such as an amine disulfide or a polymeric polysulfide and an organic vulcanization accelerator. Suitable accelerators include mercaptothiazoles, thiazole sulfenamides, thiuram sulfides, thiocarbamylsulfenamides, thioureas, xanthates, and guanidine derivatives. It is to be understood that the blends of this invention may also contain any of the well known conventional additives, such as zinc oxide, stearic acid, fillers, carbon blacks, titanium dioxide, extending oils, plasticizers and stabilizers.

In the practice of this invention, rubbery terpolymers with low unsaturation applicable to the inventive process are terpolymers of ethylene, an α-olefin and at least one non-conjugated diene, wherein only one double bond of the diene enters into the polymerization process, and wherein the diene is incorporated to the extent of about 0.1 to about 1.0 moles per kilogram of polymer. Various α-olefins containing 3 to 6 carbon atoms can be used representative of which are propylene, 1-butene, 1-pentene, and 1-hexene. Propylene is preferred. Such types of rubbery terpolymers are well known and can conveniently be prepared by addition polymerization of the monomers in the presence of a coordination or Ziegler-type catalyst complex.

Preferably, the low unsaturation rubbery terpolymer is an ethylene-propylene diene terpolymer (EPDM), where said terpolymer comprises a mole ratio of ethylene to propylene in the range of about 30/70 to about 70/30 and contains about 0.1 to about 0.8 mole of non-conjugated diene termonomer per kilogram of polymer. Preferred are non-conjugated dienes having 6–12 carbon atoms such as 1,4-hexadiene, dicyclopentadiene, 5-ethylidene-2-norbornene, 5-methylene-2-norbornene, 4,7,8,9-tetrahydroindene and 1,5-cyclooctadiene.

The mechanisms, chemical and physical, of mixing and reacting, of addition of the N-chlorothio amides and imides to the low unsaturation rubbery terpolymer and the subsequent blending and curing such modified terpolymer with other rubbers, particularly high unsaturation rubbers, with further attendant potential physical phenomenae are not fully understood. However, it may be desirable to provide some discussion on the subject although it is to be understood that this invention is not intended to be necessarily dependent on any offered theory of chemical or physical mechanism.

The addition of N-chlorothio amides or imides to the low unsaturation rubbery terpolymer has indeed been technically observed to result in an apparent chemical reaction wherein the chlorothio compound adds to the double bond of the diene termonomer. For example, with an ethylene-propylene-1,4-hexadiene terpolymer, such adduct may be represented by the formula:

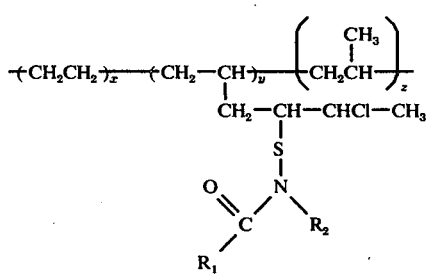

This formula is a simplification, designed for illustrative purposes. It is understood that in an actual terpolymer, the ethylene, propylene and 1,4-hexadiene units are incorporated in a more or less random fashion. Furthermore, the addition product is believed to consist of a second isomer, in which the positions of Cl— and $R_1C(O)N(R_2)$— are reversed.

Incorporation of the N-chlorothio amides or imides into low unsaturation rubbery terpolymers may be achieved by several techniques.

One method involves addition of the chlorothio compound to a solution of the polymer in an inert organic solvent, such as heptane, hexane, tetrachloroethylene, cyclohexane, methyl cyclohexane, chloroform, benzene or toluene. More polar solvents such as chloroform are preferred since they generally increase the rate of formatiion of polymer bound adduct.

Another technique comprises directly milling the chlorothio amide or imide into the polymer by means of an internal mixer (Banbury or extruder type) or an open roll mill. For direct mixing, it is advantageous to suspend or dissolve the N-chlorothio compound in a relatively inert medium such a mineral oil or chlorinated paraffin in order to improve dispersion as well as minimize hydrolysis by atmospheric moisture.

The additions of the N-chlorothio compounds in solution, or by swelling, may be generally carried out at a temperature in the range of about 10° C to about 125° C but preferably in a range of about 20° C to about 80° C, ambient temperature being the most convenient and practical in the majority of cases. Direct mixing is preferably carried out at the lowest temperature compatible with good polymer processing characteristics, usually about in the 60° to about 130° C temperature range.

The preferred amount of N-chlorothio amide or imide added depends on the specific nature of the low-unsaturated polymer, the specific nature of the highly unsaturated polymer or polymers to be used in a blend of the two types of polymers the specific cure system and the characteristics desired for the final vulcanizate. The ratio, (moles chlorothio compound)/(moles unsaturated sites in the polymer) can be from about 0.03/1 to about 1/1, but is preferably in the range of about 0.15/1 to about 0.8/1 and more preferably about 0.2/1 to about 0.7/1. With some combinations of chlorothio compounds and EPDM polymers, the use of high ratios can lead to polymer viscosity increases which make processing exceedingly difficult or even practically unmanageable. It is expected that, recognizing this, those having ordinary skill in the polymer compounding art will use a ratio which enhances characteristics of the final vulcanized blend without detrimentally increasing polymer viscosity beyond the point of ease of processability.

The practice of this invention is further illustrated by reference to the following examples which are intended to be representative rather than restrictive of the scope of the invention. Unless otherwise indicated, all parts and percentages are by weight.

Identification of the low unsaturation rubbery terpolymers off ethylene, propylene and a non-conjugated diene employed in the following Examples is outlined in the following Table 1. The unsaturation of the terpolymer is represented as moles dicyclopentandiene (or moles of carbon to carbon double bonds) per kilogram of rubber or terpolymer.

TABLE 1

| Polymer Identification | Diene | Approx unsaturation (m/kg rubber) |
|---|---|---|
| A | 1,4-hexadiene | 0.4 |
| B | 1,4-hexadiene | 0.2 |
| C | Ethylidene norbornene | 0.8 |
| D | Ethylidene norbornene | 0.3 |
| E | Dicyclopentadiene | 0.4 |

The following Examples are illustrative of the experimental procedures used for modification of solutions of low unsaturation polymers.

EXAMPLE I

A solution of 20 grams (g) of Polymer A (Table 1) in 400 milliliters (ml) of chloroform was mixed with a solution of 0.0048 mole of N-chlorothio-N-cyclohexylform amide in 4.5 ml of tetrachloroethylene. After stirring overnight, the polymer was coagulated into small flocculant particles by slow addition, with vigorous stirring, of 400 ml methanol. The precipitate was suction filtered, reslurried in acetone and suction filtered again to give a spongy, friable mass. Entrained solvents were squeezed out between paper towels, and the polymer dried at 40° C. Infrared spectroscopic analysis, and the experimentally determined percentages of carbon, hydrogen, chlorine, nitrogen and sulfur indicated 0.0175± 0.0015 mole of chemically bount adduct per 100 g of Polymer A.

EXAMPLE II

A solution of 45 g of Polymer C (Table 1) in 800 ml benzene containing 0.1 g of anhydrous sodium carbonate was mixed with a solution of 6.8 ml of tetrachloroethylene containing 0.0045 moles (M) of N-chlorothio-N-cyclohexylformamide. The mixture was stirred 6 hours (hr) at room temperature, or about 25° C, and under a dry nitrogen atmosphere. After standing overnight, the polymer was coagulated by addition of methanol. The coagulum was redissolved in chloroform, and again coagulated by slow addition of methanol, then suction filtered, washed with acetone, suction filtered, and dried at room temperature.

In the following Examples, the experimental techniques and work-up methods were analogous to those illustrated in Examples I and II, and are therefore omitted.

EXAMPLE III

Polymer C was modified in a manner identical to Example II, except that 0.009 m of N-chlorothio-N-cyclohexylformamide in 13.5 ml tetrachloroethylene was used.

EXAMPLE IV

The polymer was obtained by overnight reaction of a solution of 40 g Polymer D (Table 1) in 800 ml of chloroform with a solution of 0.004 m N-chlorothio-N-cyclohexylformamide in 1.3 ml of dichloromethane.

EXAMPLE V

The polymer was obtained by overnight reaction at room temperature (about 25° C) of a solution of 40 g of Polymer A (Table 1) in 800 ml of chloroform with 0.008 m of N-chlorothio-N-cyclohexylformamide in 2.6 ml of dichloromethane.

EXAMPLE VI

Polymer A (Table 1), 45 g, and 0.1 g anhydrous sodium carbonate in 800 ml of chloroform was stirred 1 hr at room temperature with approximately 0.009 m of N-chlorothio-N-phenylformamide in 31 ml of chlorobenzene.

EXAMPLE VII

Polymer A (Table 1), 45 g, and 0.1 g anhydrous sodium carbonate in 800 ml of chloroform was reacted overnight at room temperature with 0.01 mole of N-chlorothio in 35 ml of chlorobenzene.

EXAMPLE VIII

A solution of 50 g of Polymer B in 800 ml of chloroform containing 0.1 g anhydrous sodium carbonate was stirred 6 hr at ambient temperature with a solution of 0.005 m of N-chlorothio-N-cyclohexylformamide in 8.5 ml of tetrachloroethylene. The polymer solution was worked-up after standing overnight. Experimentally determined percentages of carbon, hydrogen, chlorine, nitrogen, and sulfur indicated approximately 0.006 moles of polymer bound adduct per 100 g of polymer B.

EXAMPLE IX

A solution of 0.0054 m N-chlorothio-N-cyclohexylformamide in 9.2 ml tetrachloroethylene was stirred 5½ hr at room temperature (about 25° C) with a solution of 45 g of Polymer E (Table 1) in 800 ml of chloroform containing 0.1 g of anhydrous sodium carbonate.

The following example illustrates the process wherein the chlorothioamide is incorporated by swelling.

EXAMPLE X

A solution of 0.016 mole of N-chlorothio-N-cyclohexylformamide in 24 ml of a mixture of carbon tetrachloride and dichloromethane was mixed with 500 ml of dry benzene in a one gallon jar. To this was added 200 g of Polymer E (Table 1) which had been cut into approximately ¼ inch ×⅛ inch ×1/16 inch chunks. The jar was sealed and the mixture tumbled for 16½ hr on a roller at room temperature, or about 25° C, then warmed at 40° C for 24 hr. Most of the solvent was then removed from the swollen polymer under vacuum. The polymer was washed with 200 ml of dichloromethane, and allowed to stand at ambient temperature and pressure until essentially all volatiles had evaporated. Yield was 202 g.

The following example illustrates the method by which the chlorothio amide is incorporated by direct mill mixing.

EXAMPLE XI

The test polymer was prepared by mixing on a conventional open roll mill, 200 g of Polymer A (Table 1) 10 g of chlorinated paraffin liquid and 7.8 g of N-chlorothio-N-cyclohexylformamide in 8.0 g of the chlorinated paraffin. For comparison purposes, a control polymer consisting of 200 g Polymer A and 16 g of chlorinated paraffin was mixed analogously.

The low-unsaturation rubber terpolymers (Table 1, A-E), before and after admixture or modification with the N-chlorothio amides or imides were evaluated in a variety of composites with high-unsaturation rubbery polymers and copolymers in order to illustrate a diversity of such composites and their vulcanizates. Test recipe master-batches shown in the following Table 2, were prepared in a size 00 (1300 gram) Banbury or Brabender Plasticorder equipped with a Banbury-type head (sized for a 50 to 60 gram charge). The remaining ingredients, which were then mixed with such individual masterbatches on a conventional open roll mill, are specified in the individual following examples.

TABLE 2

| Masterbatch | Test Masterbatches Components | Parts |
|---|---|---|
| AA | Natural Rubber (cis-1,4-poly-isoprene) | 30.0 |
| | High cis-1,4-polybutadiene rubber | 30.0 |
| | Carbon black (FEF) | 30.0 |
| | Phenolic antioxidant | 2.0 |
| | Rosin oil | 3.0 |
| | Stearic Acid | 1.0 |

TABLE 2-continued

Test Masterbatches

| Masterbatch | Components | Parts |
|---|---|---|
| BB | Natural Rubber | 33.3 |
| | High cis-1,4-polybutadiene rubber | 33.3 |
| | Carbon black (FEF) | 33.3 |
| | Phenolic antioxidant | 2.2 |
| | Rosin oil | 3.3 |
| | Stearic acid | 1.1 |
| CC | Synthetic cis-1,4-polyisoprene rubber | 70.0 |
| | Carbon black (FEF) | 50.0 |
| DD | Synthetic cis-1,4-polyisoprene rubber | 70.0 |
| | Carbon black (FEF) | 49.6 |
| | Phenolic antioxidant | 1.4 |
| EE | Butadiene/styrene rubber | 60.0 |
| | Naphthenic process oil | 15.0 |
| | Carbon black (HAF) | 50.0 |
| | Phenolic antioxidant | 1.2 |
| FF | Butadiene/styrene rubber | 60.0 |
| | Low unsaturated rubber (EPDM) | as specified |
| | Carbon black (HAF) | 50.0 |
| | Highly paraffinic process oil | 20.0 |
| | Stearic acid | 1.5 |
| GG | Butadiene/acrylonitrile rubbery copolymer | 60.0 |
| | Dibutylphthalate | 10.2 |
| | Carbon black (SRF) | 50.0 |
| | Phenolic antioxidant | 1.2 |

For the following examples, tensile strength and modulus data were obtained according to standard rubber test procedures. Dumbbell shaped samples were cut from vulcanized sheets and tested in a conventional tensile tester. Such procedure is described in "New Autographic Machine for Testing Tensile Properties of Rubber", by G J Albertomi, Industrial and Engineering Chemistry, Analytical Edition, Vol 3, P 236, 1931.

Dynamic heat build-up ($\Delta T$) and permanent set (% set) data were obtained with a Goodrich Flexometer according to ASTM D-623, Method A (0.175 inch or 0.445 cm stroke, 143 psi or 10.054 kg/cm² static load, 100° F or 38° C initial temperature).

Cure characteristics were determined on a Monsanto Oscillating Disk Rheometer, essentially according to ASTM D-2084-71-T (300° F or 149° C, 3° arc, 100 cycles/min). Pertinent data reported are: $t_4$, the time to a 4-torque unit rise above the minimum; $\Delta$ torque, the maximum torque after curing minus the minimum torque; min torque, the minimum torque; $t_{90}$, the time required to reach 90 percent of full torque development. In the subsequent examples, $t_4$ is taken as a measure of scorch delay, $\Delta$ torque is an approximation of relative modulus, min torque is an indication of the "stiffness" of the uncured stock, and $t_{90}$ as the optimum cure time. Specimens used in the Tensile and Flex tests were cured for $t_{90}$ minutes at 300° F.

In the following examples, the data are presented without comment, since the conclusion is essentially the same in all instances. That is, as a general rule, the vulcanizates derived from the low-unsaturation rubber-N-chlorothio amide or imide compositions (modified terpolymers) exhibit superior properties as compared to the controls. These superior properties are evidenced by the values for tensile strength, modulus, dynamic head build-up ($\Delta T$) and permanent set (% set).

EXAMPLE XII

Common to all: 96.00 Masterbatch AA, 40.00 Low unsaturation rubber (EPDM), 4.00 Zinc oxide, 2.00 Sulfur, 1.20 2-morpholinothiobenzothiazole.

| | Low unsaturation Rubber Source | |
|---|---|---|
| Rheometer Data | Polymer E, Table 1 (control) | Polymer from Example X |
| $t_4$, min | 19.5 | 16.6 |
| $t_{90}$, min | 28.5 | 25.6 |
| min torque | 10.7 | 15.2 |
| $\Delta$ torque | 35.8 | 47.4 |
| Stress/Strain Data | | |
| tensile, MN/m² | 8.3 | 10.9 |
| % elongation | 390 | 355 |
| 300% modulus, MN/m² | 5.8 | 8.7 |
| Goodrich Flex Data | | |
| $\Delta T$, after 15 min, °F | 123 | 75 |
| % set | 15.6 | 5.4 |

EXAMPLE XIII

Common to all: 106.5 Masterbatch BB, 33.3 Low unsaturation rubber, 3.8 Zinc oxide, 1.9 Sulfur, 0.76 2,2'-dithiobis(benzothiazole), 0.38 diphenyl guanidine.

| | Low unsaturation Rubber Source | | |
|---|---|---|---|
| Rheometer Data | Polymer C, Table 1 (control) | Polymer from | |
| | | Example II | Example III |
| $t_4$, min | 5.0 | 5.2 | 5.4 |
| $t_{90}$, min | 10.8 | 12.0 | 12.8 |
| min torque | 11.5 | 12.2 | 12.9 |
| $\Delta$ torque | 43.7 | 52.7 | 59.3 |
| Stress/Strain Data | | | |

-continued

| Rheometer Data | Low unsaturation Rubber Source | | |
|---|---|---|---|
| | Polymer C, Table 1 (control) | Polymer from Example II | Polymer from Example III |
| tensile, MN/m² | 11.3 | 13.2 | 10.1 |
| % elongation | 430 | 430 | 320 |
| 300% modulus | 6.8 | 8.0 | 9.2 |
| Goodrich Flex Data | | | |
| ΔT, after 15 mins, °F | 82 | 62 | 53 |
| % set | 7.3 | 3.4 | 2.4 |

EXAMPLE XIV

Common to all: 120.0 Masterbatch GG, 1.00 Phenolic antioxidant, 1.50 Stearic acid, 4.00 Zinc oxide, 2.00 Sulfur, 1.00 2-Morpholinodithiobenzothiazole, 0.05 tetramethylthiuram disulfide.

| Rheometer Data | Low Unsaturation Rubber | |
|---|---|---|
| | Polymer A, Table 1, 30 parts (control) | Polymer from Example I 31 parts |
| $t_s$, min | 6.2 | 6.0 |
| $t_{90}$, min | 10.3 | 10.7 |
| min torque | 12.8 | 12.2 |
| Δ torque | 60.4 | 77.3 |
| Stress/Strain Data | | |
| tensile, MN/m² | 10.4 | 14.6 |
| % elongation | 240 | 250 |
| 200% modulus, MN/m² | 8.4 | 10.3 |
| Goodrich Flex Data | | |
| ΔT, after 15 min, °F | 69 | 41 |
| % set | 4.2 | 1.3 |

EXAMPLE XV

Common to all: 121.0 Masterbatch DD, 30.0 Low unsaturation rubber, 1.5 Stearic acid, 4.0 Zinc oxide, 2.0 Sulfur, 1.05 2-Morpholinodithiobenzothiazole.

| Rheometer Data | Low Unsaturation Rubber Source | |
|---|---|---|
| | Polymer B, Table 1, (control) | Polymer from Example VIII |
| $t_s$, min | 6.4 | 6.5 |
| $t_{90}$, min | 12.0 | 13.2 |
| min torque | 14.4 | 16.0 |
| Δ torque | 51.1 | 60.0 |
| Stress/Strain Data | | |
| tensile, MN/m² | 13.3 | 14.7 |
| % elongation | 310 | 335 |
| 300% modulus | 12.7 | 13.2 |
| Goodrich Flex Data | | |
| ΔT, after 15 min, °F | 78 | 59 |
| % set | 6.5 | 2.9 |

EXAMPLE XVI

Common to all: 126.2 Masterbatch EE, 40.0 Low unsaturation rubber (EPDM), 1.5 Stearic acid, 5.0 Zinc oxide, 1.8 Sulfur, 1.4 N-cyclohexylbenzothiazole sulfenamide.

| Rheometer Data | Low unsaturation Rubber Source | | | |
|---|---|---|---|---|
| | Polymer A Table 1 (control) | Polymer from Ex V | Polymer D, Table 1, (control) | Polymer from Ex IV |
| $t_s$, min | 9.3 | 9.3 | 8.8 | 8.7 |
| $t_{90}$, min | 20.0 | 28.5 | 22.7 | 29.2 |
| min torque | 12.8 | 15.8 | 13.0 | 18.4 |
| Δ torque | 42.2 | 66.2 | 61.5 | 73.6 |
| Stress/Strain Data | | | | |
| tensile, MN/m² | 6.4 | 10.5 | 19.2 | 16.9 |
| % elongation | 185 | 210 | 350 | 265 |
| 200% modulus | 7.2 | 9.8 | 10.0 | 11.1 |
| Goodrich Flex Data | | | | |
| ΔT, after 15 min, °F | Failed, 3 min | 64 | 91 | 65 |
| % set | — | 1.7 | 6.5 | 1.7 |

EXAMPLE XVII

Common to all: 126.2 Masterbatch EE, 40.0 Low unsaturation rubber (EPDM), 1.5 Stearic acid, 5.0 Zinc oxide, 1.8 Sulfur, 1.4 N-cyclohexylbenzothiazole sulfenamide.

| Rheometer Data | Low unsaturation Rubber Source | | |
|---|---|---|---|
| | Polymer A Table 1 (control) | Polymer From Example VII | Polymer from Example VI |
| $t_s$, min | 10.4 | 11.8 | 10.0 |

-continued

| Rheometer Data | Low unsaturation Rubber Source | | |
|---|---|---|---|
| | Polymer A Table 1 (control) | Polymer From Example VII | Polymer from Example VI |
| $t_{90}$, min | 26.7 | 64 | 37.5 |
| min torque | 12.5 | 14.6 | 18.0 |
| Δ torque | 46.5 | 70.4 | 67.0 |
| Stress/Strain data | | | |
| tensile, MN/m² | 7.3 | 11.9 | 16.5 |
| % elongation | 205 | 210 | 270 |
| 200% modulus | 7.1 | 11.1 | 10.3 |
| Goodrich Flex Data | | | |
| ΔT, after 15 min, °F | Failed, <3 min | 61 | 64 |
| % set | — | 1.2 | 1.4 |

EXAMPLE XVIII

Control Masterbatch, 174.7 parts (Masterbatch FF with 43.2 parts control polymer from Example XI); Test Masterbatch, 176.7 parts (Masterbatch FF with 45.2 parts test polymer from Example XI). Common to both: 5.0 Zinc oxide, 1.8 Sulfur, 1.2 N(t-butyl)-2-benzothiazole sulfenamide.

| Rheometer Data | Low unsaturation rubber | |
|---|---|---|
| | Control | Test |
| $t_4$, min | 12.4 | 10.8 |
| $t_{90}$, min | 28.6 | 30.5 |
| min torque | 13.5 | 20.3 |
| Δ torque | 41.5 | 55.7 |
| Stress/Strain Data | | |
| tensile, MN/m² | 8.2 | 8.3 |
| % Elongation | 270 | 180 |
| 100% modulus, MN/m² | 2.2 | 3.5 |
| Goodrich Flex Data | | |
| ΔT, after 15 min, °F | failed, <6 min | 71 |
| % set | — | 4.0 |

EXAMPLE XIX

Common to all: 121.4 Masterbatch GG, 40.0 Low unsaturation rubber, 1.0 Stearic acid, 5.0 Zinc oxide, 1.5 Sulfur, 0.4 Tetramethylthiuram disulfide.

| Rheometer Data | Low Unsaturation Rubber Source | |
|---|---|---|
| | Polymer E, Table 1 (control) | Polymer from Example IX |
| $t_4$, min | 6.2 | 6.2 |
| $t_{90}$, min | 14.5 | 16.2 |
| min torque | 8.6 | 9.5 |
| Δ torque | 38.4 | 51.5 |
| Stress/Strain Data | | |
| tensile, MN/m² | 6.1 | 8.8 |
| % elongation | 205 | 250 |
| 200% modulus, MN/m² | 6.0 | 6.9 |
| Goodrich Flex Data | | |
| Time to failure, min | 2 | 7 |
| ΔT, °F, at failure | 46 | 82 |

In the practice of this invention, the various N-chlorothio-carboxylic acid amides or imides suitable for use in the admixture described in this invention can suitable be prepared by reacting the corresponding N,N'-dithiobis(amide or imide) with chlorine or sulfuryl chloride. Various example procedures are conveniently described in British Pat. No. 1,355,801 and Belgian Pat. No. 816,266.

While certain representative embodiments and details have been shown for the purpose of illustrating the invention, it will be apparent to those having skill in this art that various changes and modifications may be made therein without departing from the spirit or scope of the invention.

What is claimed is:

1. A chemically modified rubbery terpolymer which comprises the admixture product of a rubbery terpolymer of ethylene, α-olefin containing 3 to 6 carbon atoms and a non-conjugated diene containing 6 to 12 carbon atoms with at least one compound selected from N-chlorothio-carboxylic acid amides and imides of the formulae:

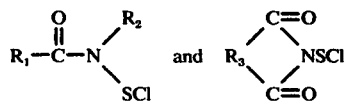

where $R_1$ and $R_2$ are radicals which can be individually selected from alkyl, cycloalkyl, benzyl, and phenyl radicals, where $R_1$ can additionally be selected from hydrogen, where the aromatic rings of said phenyl and benzyl radicals may be substituted with one or two radicals selected from alkyl and chloro radicals, where $R_1$ and $R_2$ may be taken together to represent an alkylene radical of 3 to 5 carbon atoms and where $R_3$ may be an alkylene radical of 2–4 carbon atoms, a 1,2-cycloalkylene radical of 6–8 carbon atoms, or an orthophenylene radical of 6 to 8 carbon atoms.

2. The modified rubbery terpolymer of claim 1 where said terpolymer is comprised of a mole ratio of ethylene to propylene of about 30/70 to about 70/30 and contains about 0.1 to about 0.8 mole of non-conjugated diene termonomer per kilogram of polymer, where said diene is selected from 1,4-hexadiene, dicyclopentadiene, 5-methylene-2-norbornene, 4,7,8,9-tetrahydroindene and 1,5-cyclooctadiene.

3. The modified rubbery terpolymer of claim 2 where, in the N-chlorothio-carboxylic amides and imides, said alkyl radicals are selected from methyl, ethyl, n-propyl, isopropyl, n-butyl and isobutyl radicals; and cycloalkyl radicals are selected from cyclohexyl and cyclooctyl radicals; said phenyl radicals are selected from p-xylyl and 2,4-dichlorophenyl radicals; said benzyl radicals are selected from p-methylbenzyl and p-chlorobenzyl radicals; and said alkylene radical formed by joining $R_1$ and $R_2$ is pentamethylene, and $R_3$ is selected from ethylene, 1,2-cyclohexylene or ortho-phenylene radicals.

4. The modified rubbery terpolymer of claim 2 where said N-chlorothio-carboxylic acid amides and imides are selected from N-chlorothio-N-cyclohexyl formamide, N-chlorothio-N-phenyl formamide, N-chlorothio-N-(p-chlorophenyl)formamide and N-chlorothiophthalimide.

5. The modified rubbery terpolymer of claim 2 where said compound to be selected from N-chlorothio-carboxylic acid amides and imides is N-chlorothio-N-cyclohexyl formamide.

6. The modified rubbery terpolymer of claim 2 where said N-chlorothio-carboxylic acid compound is N-chlorothio-N-cyclohexyl formamide and where, in said terpolymer, said non-conjugated diene is selected from 1,4-hexadiene, dicyclopentadiene and 5-ethylidene-2-norbornene.

7. A composite which comprises 100 parts by weight of a modified rubbery terpolymer of claim 4 in admixture with about 18 to about 670 parts by weight of a rubbery polymer selected from at least one of cis-1,4-polyisoprene natural rubber, synthetic cis-1,4-polyisoprene, polybutadiene, butadiene-styrene copolymer with a butadiene/styrene mole ratio in the range of about 60/40 to about 95/5, butadiene-acrylonitrile copolymer, polypentenamer of the type derived from open ring polymerization of cyclopentene, bromobutyl rubber, chlorobutyl rubber and polychloroprene.

8. The sulfur-cured composite of claim 7.

9. The composite of claim 8 where said N-chlorothio-N-carboxylic compound is N-chlorothio-N-cyclohexyl formamide and where, in said terpolymer, said nonconjugated diene is selected from 1,4-hexadiene, dicyclopentadiene and 5-ethylidene-2-norbornene.

10. A method of preparing the modified rubbery terpolymer of claim 1 which comprises mixing said N-chlorothio-acid amide/imide with a mixture of said terpolymer and an organic solvent selected from heptane, tetrachloroethylene, cyclohexane, methyl cyclohexane, chloroform, benzene and toluene.

11. A pneumatic tire casing of toroidal shape, with outer tread portion and spaced beads and having a sidewall connecting said tread portion and bead comprised of said sulfur-cured composite of claim 8.

12. The modified rubbery terpolymer of claim 1 where the ratio, (moles chlorothio compound)/(moles unsaturated sites in said terpolymer), is about 0.03/1 to about 1/1.

* * * * *